United States Patent Office 3,824,309
Patented July 16, 1974

3,824,309
METHODS OF COMBATTING BACTERIA AND FUNGI USING BICYCLIC OXAZOLIDINES
Harald Schnegelberger, Leichlingen, Rhineland, and Horst Bellinger, Dusseldorf, Germany, assignors to Henkel & Cie GmbH, Dusseldorf-Holthausen, Germany
No Drawing. Filed Mar. 30, 1973, Ser. No. 346,312
Claims priority, application Germany, Apr. 15, 1972, P 22 18 348.8
Int. Cl. A01n 9/22, 9/28
U.S. Cl. 424—272
8 Claims

ABSTRACT OF THE DISCLOSURE

Bicyclic oxazolidines are useful as antimicrobial agents in cosmetic and pharmaceutical preparations to prevent the growth of microorganisms.

PRIOR ART

It is already known from the German Pat. No. 1,148,706 to use the reaction product of equimolar quantities of formaldehyde and hydroxyethylamine as disinfecting and preserving agents for drilling oil emulsions. The reaction product which is mentioned in the above Germany patent is an s-triazine derivative, namely the 1,3,5-tris-(β-hydroxyethyl)-hexahydro-s-triazine, and not a bicyclic oxazolidine. Although this s-triazine compound has good disinfecting and preserving properties, it has so many disadvantages that it is suitable for practical use only in special cases. Its aqueous solutions are thermally unstable and result in considerable changes in color when heated. This instability is increased to a considerable extent in solution having pH values of 7 to 10, resulting in a considerable discoloration occurring at room temperature, thus excluding the use of the prior art s-triazine derivative product in most cleansing agents.

OBJECTS OF THE INVENTION

It is an object of the present invention to provide an antimicrobial bicyclic oxazolidine containing composition and method of using the same against gram-positive and gram-negative bacteria and against fungi, which antimicrobial bicyclic oxazolidine composition is stable in the alkaline region and during prolonged periods of heating.

It is another object of the present invention to provide an antimicrobial composition active against gram-positive bacteria, gram-negative bacteria and fungi consisting of from 0.1% to 10% by weight based upon the total weight of a bicyclic oxazolidine of the formula

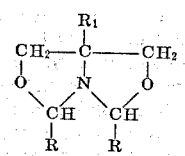

in which R is selected from the group consisting of hydrogen, alkyl of 1 to 7 carbon atoms and phenyl, and in which $R_1$ is selected from the group consisting of hydrogen, alkyl of 1 to 3 carbon atoms, and hydroxyalkyl of 1 to 3 carbon atoms, and the remainder of an inert carrier.

It is a further object of the present invention to provide a process for the prevention of the growth of microorganisms selected from the group consisting of gram-positive bacteria, gram-negative bacteria and fungi which consists essentially of contacting said microorganisms with an amount effective to prevent the growth of said microorganisms of a bicyclic oxazolidine of the formula

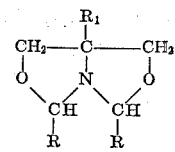

in which R is selected from the group consisting of hydrogen, alkyl of 1 to 7 carbon atoms and phenyl, and in which $R_1$ is selected from the group consisting of hydrogen, alkyl of 1 to 3 carbon atoms and hydroxyalkyl of 1 to 3 carbon atoms.

These and other and further objects of the present invention will become apparent as the description thereof proceeds.

DESCRIPTION OF THE INVENTION

We have now found that substituted 1-aza-3,7-dioxabicyclo-(3,3,0)-octanes of the formula I:

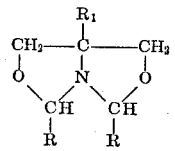

in which R represents hydrogen, an alkyl of 1 to 7 carbon such as $CH_3$, $C_2H_5$, $C_3H_7$, $(CH_3)_2CH$,

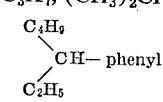

and $R_1$ represents hydrogen, an alkyl of 1 to 3 carbon atoms such as $CH_3$, $C_2H_5$, $C_3H_7$, $(CH_3)_2CH$ or a hydroxyalkyl of 1 to 3 carbon atoms such as hydroxymethyl, are excellent for use as antimicrobial substances.

The present invention is therefore directed to an antimicrobial composition active against gram-positive bacteria, gram-negative bacteria and fungi consisting of from 0.1% to 10% by weight based upon the total weight of a bicyclic oxazolidine of the formula

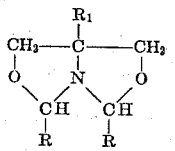

in which R is selected from the group consisting of hydrogen, alkyl of 1 to 7 carbon atoms and phenyl, and in which $R_1$ is selected from the group consisting of hydrogen, alkyl of 1 to 3 carbon atoms, and hydroxyalkyl of 1 to 3 carbon atoms, and the remainder of an inert carrier selected from the group consisting of an anionic surfactant, a non-ionic surfactant, a solvent, a dissolving intermediate, and the mixtures thereof.

The present invention is furthermore directed to a process for the prevention of the growth of microorganisms selected from the group consisting of gram-positive bacteria, gram-negative bacteria and fungi which consists essentially of contacting said microorganisms with an amount effective to prevent the growth of said microorganisms of a bicyclic oxazolidine of the formula

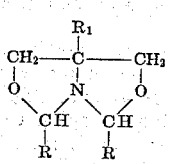

in which R is selected from the group consisting of hydrogen, alkyl of 1 to 7 carbon atoms and phenyl, and in which $R_1$ is selected from the group consisting of hydrogen, alkyl of 1 to 3 carbon atoms and hydroxyalkyl of 1 to 3 carbon atoms.

The present invention is additionally directed to a process for the prevention of the growth microorganisms selected from the group consisting of gram-positive bacteria, gram-negative bacteria and fungi in a preparation which consists essentially of contacting said preparation with an amount effective to prevent the growth of said microorganisms of a bicyclic oxazolidine of the formula

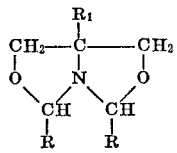

in which R is selected from the group consisting of hydrogen, alkyl of 1 to 7 carbon atoms and phenyl, and in which $R_1$ is selected from the group consisting of hydrogen, alkyl of 1 to 3 carbon atoms, and hydroxyalkyl of 1 to 3 carbon atoms.

The substituent R is hydrogen, phenyl, or alkyl of 1 to 7 carbon atoms, such as methyl, ethyl, propyl, isopropyl, or butyl-ethyl-methyl; and the substituent $R_1$ is hydrogen, alkyl of 1 to 3 carbon atoms such as methyl, ethyl, propyl, or isopropyl, or hydroxyalkyl of 1 to 3 carbon atoms such as hydroxymethyl.

The substituted 1 - aza-3,7-dioxabicyclo(3,3,0)-octanes usable in accordance with the invention may be produced by reacting 2 mol of a corresponding aldehyde with 1 mol of an amino polyalcohol, as has been described by Murray Senkus in the "Journal of the American Chemical Society," 67 (1945) on pages 1515 to 1519.

Suitable examples of the bicyclic oxazolidines which may be used in accordance with the present invention therefore are 1-aza-3,7-dioxabicyclo-(3,3,0)-octane,
5-methyl-1-aza-3,7-dioxabicyclo-(3,3,0)-octane,
5-ethyl-1-aza-3,7-dioxabicyclo-(3,3,0)-octane,
5-propyl-1-aza-3,7-dioxabicyclo-(3,3,0)-octane,
5-isopropyl-1-aza-3,7-dioxabicyclo-(3,3,0)-octane,
5-hydroxymethyl-1-aza-3,7-dioxabicyclo-(3,3,0)-octane,
5-methyl-2,8-dipropyl-1-aza-3,7-dioxabicyclo-(3,3,0)-octane,
5-ethyl-2,8-dipropyl-1-aza-3,7-dioxabicyclo-(3,3,0)-octane, and
5-methyl-2,8-diphenyl-1-aza-3,7-dioxabicyclo-(3,3,0)-octane.

The antimicrobial substances may be incorporated in liquid, paste or solid preparations, such as aqueous solutions, suspensions, emulsions, solutions in organic solvents or oils, salves, creams, pencils, powder, or soaps, which can be used as cleansing agents, general and special cosmetics and other cosmetic preparations. However, the bicyclic oxazolidines may also be used to advantage in antimicrobial cleansing, disinfecting and preserving agents for textiles, floors, hospital apparatus and instruments, for commercial concerns such as dairies, breweries and laundries, and for preserving technical products.

The amount of the antimicrobial agents in the compositions to be used in accordance with the invention may vary from 0.1% to 10% by weight, preferably from 0.5% to 5% by weight, and especially from 0.1% to 2% by weight.

The bicyclic oxazolidine may be used in accordance with the invention in combination with inorganic and organic complexing agents which, in the Hampshire test, exhibit a calcium carbonate binding capacity greater than 230 mg. per gm. of complex former. Thus, if required, it is possible to obtain increased efficacy. Many of these materials are listed in U.S. Pat. 3,625,904.

The bicyclic oxazolidines have the advantages of being active at very low concentrations against both gram-positive and gram-negative bacteria as well as fungi, and of being completely stable during long periods of heating and also with alkaline pH values between 7 and 10, as well as in neutral and acidic pH ranges. Thus they provide for the widespread use thereof in a variety of cosmetic and pharmaceutical preparations. It is an additional advantage of the bicyclic oxazolidines to be used in accordance with the invention that they are less toxic than the formaldehyde hydroxyethylamine reaction product known from the said German Pat. No. 1,148,706 of the prior art.

The following examples are merely illustrative of the present invention without being deemed limitative in any manner thereof.

EXAMPLES

The compounds listed below were tested for antimicrobial efficacy. The compounds were produced in accordance with the data given in the "Journal of the American Chemical Society," 67 (1945), pages 1515–1517, by heating mixtures of 2 mols of corresponding aldehydes with 1 mol of the corresponding aminopolyalcohol in benzene solution at reflux. After the separation of water had been completed, the benzene was distilled off, and the residue could be used directly for the experiments.

(A) 1-aza-3,7-dioxabicyclo-(3,3,0)-octane
(B) 5-methyl-1-aza-3,7-dioxabicyclo-(3,3,0)-octane
(C) 5-ethyl-1-aza-3,7-dioxabicyclo-(3,3,0)-octane
(D) 5-isopropyl-1-aza-3,7-dioxabicyclo-(3,3,0)-octane
(E) 5-hydroxymethyl-1-aza-3,7-dioxabicyclo-(3,3,0)-octane
(F) 5-methyl-2,8-dipropyl-1-aza-3,7-dioxabicyclo-(3,3,0)-octane
(G) 5-methyl-2,8-diphenyl-1-aza-3,7-dioxabicyclo-(3,3,0)-octane.

The inhibiting concentrations of the individual substances were determined using the so-called "plate test." This test constitutes a modified form of the dilution test for determining the microbiostatic effect as described in the method for testing chemical disinfectants by the German Society for Hygiene and Microbiology, under methods of preliminary evaluations of such materials, and can be used to advantage in different tests not utilizing the liquid nutrient media stated in the said directives. The advantage of solid nutrient media is obvious, particularly when testing the efficacy of substances with respect to fungi.

The desired test concentrations were produced by mixing measured quantities of solutions of suitable concentrations of the test substances with measured quantities of liquified broth-agar or beer wort-agar in sterile Petri dishes. Merck Standard I broth-agar or wort-agar was always used. The quantities of the substance solution measured by means of a pipette were from 0.1 ml. to a maximum of 1 ml., and the total volume of the Petri dishes amounted to 10 ml. after mixing with the nutrient medium. After the nutrient medium had solidified, the surface was injected with the test suspension of germs in broth or wort which contained about $10^8$ germs per ml. Incubation was effected at 37° C. or 30° C. in an incubator and lasted 8 days. Subsequently it was determined which substance concentration incorporated in the nutrient medium could fully inhibit the growth of the germs. The value thus determined was designated the "minimum inhibiting concentration" (m.i.c.). The tests were carried out in the following intervals of concentrations: 5000 p.p.m., 4000 p.p.m., 3000 p.p.m., 2000 p.p.m., 1500 p.p.m., 1000 p.p.m., 900 p.p.m, 800 p.p.m., 700 p.p.m., 600 p.p.m., 500 p.p.m., 400 p.p.m., 300 p.p.m., 200 p.p.m., 100 p.p.m., 50 p.p.m., and 10 p.p.m.

The following table gives the minimum inhibiting concentrations determined for the individual substances in the plate test.

The test organisms were:

(1) Staphyloccocus aureus
(2) Escherichia coli
(3) Pseudomonas aeruginosa
(4) Candida albicans
(5) Epidermophyton Kaufmann-Wolf.

A sample of 1,3,5-tris-($\beta$-hydroxyethyl)-hexahydro-s-triazine (obtained, in accordance with German Pat. No. 1,148,706 by reacting equimolar quantities of formaldehyde and hydroxyethylamine) as included in the test as substance H for comparison purposes only.

TABLE.—Inhibiting concentration in plate test in p.p.m.

| Substance | Test bacteria | | | | |
|---|---|---|---|---|---|
| | 1 | 2 | 3 | 4 | 5 |
| A | 400 | 400 | 300 | 500 | 100 |
| B | 300 | 400 | 400 | 500 | 200 |
| C | 500 | 500 | 500 | 700 | 200 |
| D | 300 | 500 | 400 | 600 | 100 |
| E | 200 | 500 | 700 | 1,000 | 200 |
| F | 500 | 700 | 600 | 1,000 | 300 |
| G | 700 | 600 | 600 | 1,000 | 300 |
| H | 300 | 500 | 600 | 700 | 200 |

The inhibiting concentrations which were found showed that the antimicrobial efficacy of the bicyclic oxazolidines, to be used in accordance with the invention, is essentially the same as the said reaction product of formaldehyde and hydroxyethylamine which is known to be a very satisfactory antimicrobial agent.

To indicate or prove the superior stability of the antimicrobial bicyclic oxazolidines in accordance with the invention, the following stability tests were carried out, again in comparison with 1,3,5-tris-($\beta$-hydroxy-ethyl)-hexahydro-s-triazine.

Clear, colorless 45% aqueous solutions were produced from the bicyclic oxazolidines C and E at room temperature. A colorless 45% aqueous solution of a freshly prepared 1,3,5-tris-($\beta$-hydroxyethyl)-hexahydro-s-triazine, designated as substance H, was used for the purpose of comparison. The three aqueous solutions were heated to 60° C. for 100 hours in sealed glass flasks. The solutions of bicyclic oxazolidines C and E remained clear and colorless, while the solution of substance H turned yellow after 46 hours and had assumed a yellowish brown color by the end of the experiment.

The water contained in the solution of bicyclic oxazolidine E, heated as described above, was distilled off in vacuo, and the residue dried in vacuo using phosphorus pentoxide. The 5-hydroxymethyl-1-aza-3,7-dioxabicyclo-(3,3,0)-octane was recovered quantitatively, and had a melting point of 53° C. after heating, while the melting point before the experiment was 54° C.

In the following experiment, 5 gm. of bicyclic oxazolidine E were dissolved in 50 ml. of a buffer solution (Titrisol of the firm Merck, pH=7) at room temperature. The clear solution obtained had a pH value of 7.3 at 20° C. After heating to 60° C. for 96 hours in a sealed glass flask, the colorless solution was evaporated to dryness in vacuo. The 5-hydroxy-methyl-1-aza-3,7-dioxabicyclo-(3,3,0)-octane used was recovered quantitatively and had an unchanged melting point of 54° C.

Analogously, 5 gm. of substance H were dissolved in 50 ml. of a buffer solution having a pH value of 7, and heated to 60° C. The solution assumed a yellowish brown color after 20 hours.

Furthermore, a solution of 5 gm. of substance H in 50 ml. of a buffer solution having a pH value of 7 was stored for 6 days in a sealed flask at room temperature. The solution had turned yellowish brown after this period of time, while a solution of 5 gm. of bicyclic oxazolidine E, treated in an analogous manner, was completely unchanged in appearance.

Additionally, the acute oral toxicity of bicyclic oxazolidines C and E, compared with substance H, was tested on mice. The following LD$_{50}$ values were found after 8 days observation.

| | Mg./kg. |
|---|---|
| Substance C | 6.7 |
| Substance E | 5.0 |
| Substance H | 1.99 |

The above-mentioned experiment results show that the bicyclic oxazolidines used in accordance with the invention, have the same very satisfactory antimicrobial effect as the known reaction product of formaldehyde and hydroxyethylamine, but exhibit a superior stability and a substantially lower toxicity.

Formulations for some antimicrobial agents are given below, in which all parts listed below are parts by weight:

Disinfectant hand-washing paste:

| | Parts |
|---|---|
| Sodium lauryl sulfate | 50.0 |
| Coconut oil acid monoethanolamide | 3.0 |
| Finely ground pumice | 40.0 |
| Nitrilotriacetic acid, Na salt (NTA) | 2.0 |
| Substance C | 4.0 |

Deodorant pencil:

| | |
|---|---|
| Stearyl alcohol | 10.0 |
| 2-octyldodecanol | 10.0 |
| Coconut oil acid monoethanolamide | 10.0 |
| Stearic acid monoethanolamide | 15.0 |
| Carnauba wax | 2.0 |
| Paraffin (72° C. melting point) | 10.0 |
| Perfume oil | 2.0 |
| 1,2-propyleneglycol | 38.0 |
| Substance E | 3.0 |

Deodorant spray:

| | |
|---|---|
| 2-octyldodecanol | 12.0 |
| Substance C | 2.0 |
| Perfume | 1.0 |
| Ethanol | 85.0 |
| Propellent gas | 100.0 |

Antiseptic cleansing agent for laundries:

| | |
|---|---|
| Sodium coconut fatty alcohol sulfate | 22.0 |
| Sodium tripolyphosphate | 32.0 |
| Sodium carbonate | 9.0 |
| Sodium sulfate | 13.0 |
| Water glass | 5.0 |
| Sodium carboxymethyl-cellulose | 1.0 |
| Substance A | 7.0 |
| Water | 11.0 |

Antiseptic shampoo:

| | |
|---|---|
| Sodium lauryl ether sulfate (27% to 28% washing active substance) | 40.0 |
| Coconut fatty acid diethanolamide | 6.0 |
| Substance B | 4.0 |
| Water | 50.0 |

Foam bath:

| | |
|---|---|
| Sodium lauryl ether sulfate (27% to 28% washing active substance) | 70.0 |
| Coconut fatty acid diethanolamide | 5.0 |
| Substance D | 2.0 |
| Water | 23.0 |

Antimicrobial soap.—When manufacturing a toilet soap from a mixture of 60% coconut fatty acid and 40% stearic fatty acid, bicyclic oxazolidine C is incorporated with the dye and the perfume in the extruder, with the amount of bicyclic oxazolidine C being such that the finished soap contains 3% by weight thereof. The effect of the antimicrobial substance is further increased if a complexing agent, such as NTA, EDTA or EHDP, is included in the soap in such a quantity that its proportion in the soap amounts to 8% by weight.

Antimicrobial fine washing agent:

| | Parts |
|---|---|
| Dodecyl benzene sulfonate (Na salt) | 30.0 |
| Toluene sulfonate (Na salt) | 2.0 |
| Sodium coconut fatty alcohol sulfate | 8.0 |
| Sodium sulfate | 30.0 |
| Sodium carboxymethyl-cellulose | 1.0 |
| Substance F | 4.0 |
| Water | 25.0 |

In addition to being utilizable in cleansing agents for obtaining antimicrobial efficacy in these agents, the bicyclic oxazolidines of the invention may also be used in accordance with the invention for preserving cosmetics, starch pastes, glues, dispersion dyes, cutting and drilling oils and the like, such as in the products given below. For this purpose, an addition of 0.1% to 2% by weight, based upon the product to be preserved, is generally sufficient.

| Day cream and lotion: | Parts |
|---|---|
| Decyl oleate | 10.0 |
| Vegetable oil | 10.0 |
| Glycerine 28° Bé. | 5.0 |
| Colloidal dispersion mixture of 90 parts C$_{16}$ to C$_{18}$ alcohol and 10 parts sodium lauryl sulfate | 15.0 |
| Substance C | 1.0 |
| Water | 59.0 |
| Emulsion shampoo: | |
| Sodium lauryl sulfate (90% washing active substance) | 10.0 |
| Coconut fatty acid diethanolamide | 3.0 |
| Ethyleneglycol stearate | 2.0 |
| Sodium chloride | 1.0 |
| Substance B | 0.5 |
| Water | 83.5 |
| Shampoo with egg yolk: | |
| C$_{12}$ to C$_{18}$ fatty alcohol sulfate mixture (40% washing active substance) | 45.0 |
| Egg yolk, liquid commercial | 2.0 |
| Sodium chloride | 0.3 |
| Substance E | 1.5 |
| Water | 51.2 |

The bicyclic oxazolidines used in accordance with the invention can also be used as an antimicrobial substance in chemical cleaning liquors based on organic solvents having a low water content. The bicyclic oxazolidines A to G may be added to the cleaning liquors in a concentration of from 1 to 10 gm./liter. The cleaning intensifiers based on anionic surface active compounds and non-ionic surface active compounds are generally added to the cleaning liquors in the form of concentrates which, in addition to the surface active compound, contain solvents such as chlorinated hydrocarbons or mineral oil, and, if required, dissolving intermediaries such as isopropanol, and water. The bicyclic oxazolidines can be incorporated in these concentrates and metered together with the cleaning intensifier. In the case of chemical (dry) cleaning, sufficient water is added to the cleaning liquors to ensure that the relative humidity is at least 70% in the steam space above the liquor during the cleaning operation.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the prevention of the growth of microorganisms selected from the group consisting of gram-positive bacteria, gram-negative bacteria and fungi which consists essentially of contacting said microorganisms with an amount effective to prevent the growth of said microorganisms with a bicyclic oxazolidine of the formula

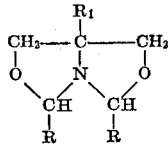

in which R is selected from the group consisting of hydrogen, alkyl of 1 to 7 carbon atoms and phenyl, and in which R$_1$ is selected from the group consisting of hydrogen, alkyl of 1 to 3 carbon atoms and hydroxyalkyl of 1 to 3 carbon atoms.

2. A process for the prevention of the growth of microorganisms selected from the group consisting of gram-positive bacteria, gram-negative bacteria and fungi in a preparation selected from the group consisting of a cosmetic preparation and a pharmaceutical preparation which consists essentially of contacting said preparation with an amount effective to prevent the growth of said microorganisms with a bicyclic oxazolidine of the formula

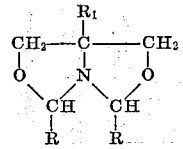

in which R is selected from the group consisting of hydrogen, alkyl of 1 to 7 carbon atoms and phenyl, and in which R$_1$ is selected from the group consisting of hydrogen, alkyl of 1 to 3 carbon atoms, and hydroxyalkyl of 1 to 3 carbon atoms.

3. The process of claim 2, in which R is selected from the group consisting of hydrogen, methyl, ethyl, propyl, isopropyl,

and phenyl; and in which R$_1$ is selected from the group consisting of hydrogen, methyl, ethyl, propyl, isopropyl, and hydroxymethyl.

4. The process of claim 2 in which said amount effective to prevent the growth of said microorganisms in said preparation is from 0.1% to 10% by weight of said bicyclic oxazolidine based upon the total weight of said preparation.

5. The process of claim 2 in which said amount effective to prevent the growth of said microorganisms in said preparation is from 0.5% to 5% by weight of said bicyclic oxazolidine based upon the total weight of said preparation.

6. The process of claim 2 in which said preparation is a cosmetic preparation.

7. The process of claim 2 in which said preparation is a pharmaceutical preparation.

8. The process of claim 2 in which said effective amount to prevent growth of said microorganisms in said preparation is from 0.1% to 2% by weight of said bicyclic oxazolidine based upon the total weight of said preparation.

References Cited

Senkus: Journal of the Amer. Chem. Society, vol. 67 (1945), pp. 1515–1519.

Chem. Abst., vol. 39 (1945), p. 3009, Senkus.

ALBERT T. MEYERS, Primary Examiner

A. J. ROBINSON, Assistant Examiner

U.S. Cl. X.R.

252—106, 107; 424—14, 47